US010820654B1

(12) United States Patent
Gentry

(10) Patent No.: US 10,820,654 B1
(45) Date of Patent: Nov. 3, 2020

(54) MOUTHGUARD RETAINING DEVICE

(71) Applicant: Bryant Kevin Gentry, Glen Burnie, MD (US)

(72) Inventor: Bryant Kevin Gentry, Glen Burnie, MD (US)

( * ) Notice: Subject to any disclaimer, the term of this patent is extended or adjusted under 35 U.S.C. 154(b) by 0 days.

(21) Appl. No.: 16/420,726

(22) Filed: May 23, 2019

(51) Int. Cl.
*A42B 3/04* (2006.01)
*F16M 13/04* (2006.01)
*A63B 71/08* (2006.01)
*A63B 71/10* (2006.01)

(52) U.S. Cl.
CPC ........... *A42B 3/0406* (2013.01); *F16M 13/04* (2013.01); *A63B 71/085* (2013.01); *A63B 71/10* (2013.01); *A63B 2071/088* (2013.01)

(58) Field of Classification Search
CPC ......... Y10T 24/45581; Y10T 24/45534; Y10T 24/45524; Y10T 24/45529; A42B 3/0406
USPC .......................................... 224/614–616, 625
See application file for complete search history.

(56) References Cited

U.S. PATENT DOCUMENTS

| 1,477,597 | A | * | 12/1923 | Schneider | .................. A41F 1/00 24/616 |
| 5,778,498 | A | * | 7/1998 | Laks | ...................... A43C 11/00 24/615 |
| 2013/0036533 | A1 | * | 2/2013 | Gentry | ..................... A42B 3/18 2/422 |
| 2013/0291291 | A1 | * | 11/2013 | Gentry | .................. A63B 71/10 2/422 |
| 2017/0295879 | A1 | * | 10/2017 | Fancher | ............... A42B 3/0406 |

* cited by examiner

*Primary Examiner* — Scott T McNurlen
(74) *Attorney, Agent, or Firm* — Laubscher & Laubscher, P.C.

(57) ABSTRACT

A device for connecting a mouthguard with a helmet includes a clip assembly with a base adapted for connection with the helmet and an arm releasably connected at a first end with the base. The arm is formed of resilient material and operable between an open position for receiving the mouthguard and a closed position for retaining the mouthguard against the helmet. The arm preferably has an elongated concave configuration and includes a second end having a first portion which abuts against the helmet and a second portion for engagement by a finger of a user to displace the arm between the open and closed position.

11 Claims, 4 Drawing Sheets

FIG. 2
FIG. 3
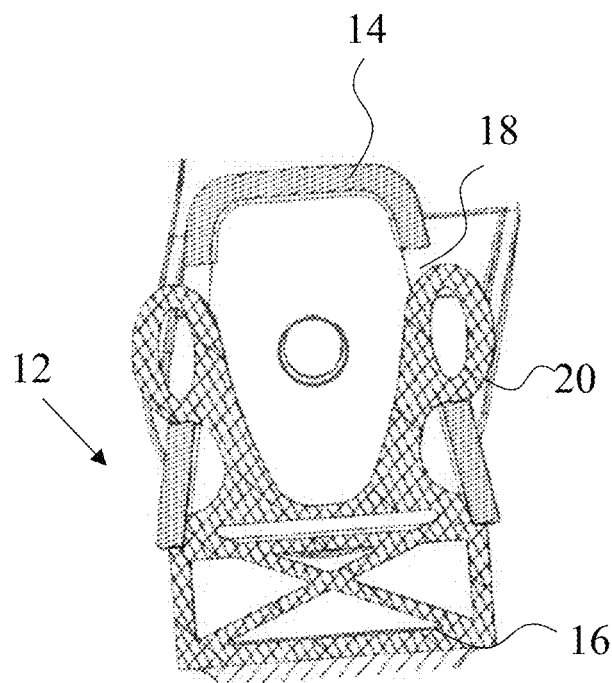
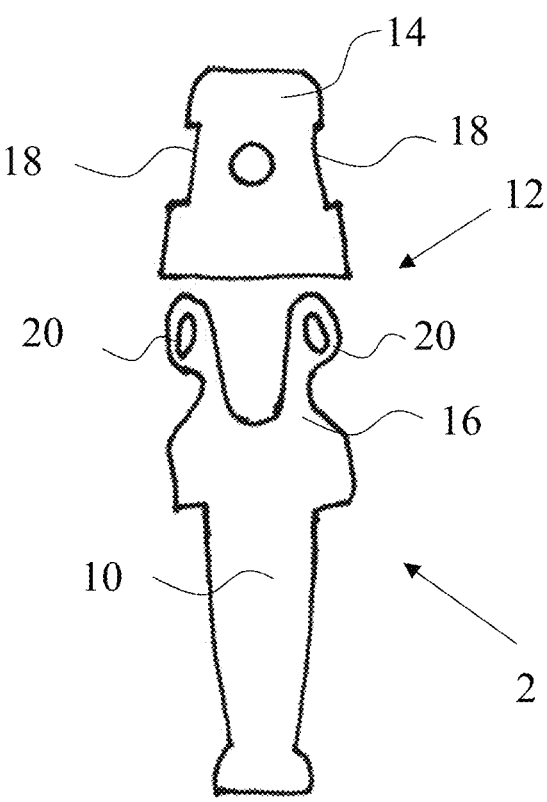
FIG. 4
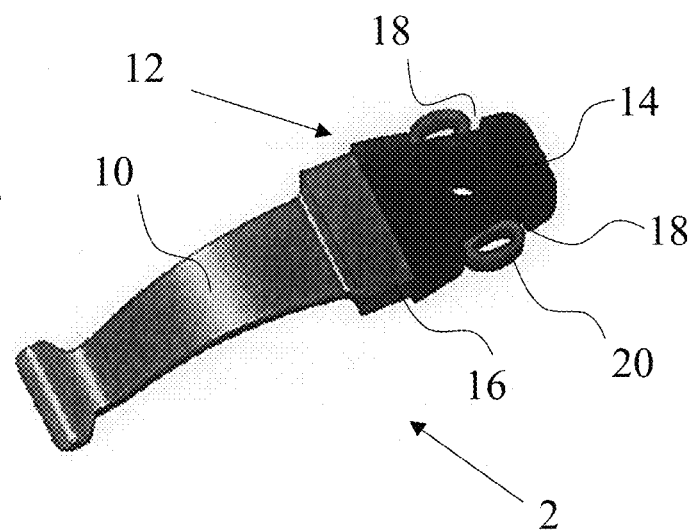

MOUTHGUARD RETAINING DEVICE

BACKGROUND OF THE DISCLOSURE

The present disclosure relates to a device for connecting a mouthguard with a helmet, and more specifically, it relates to a device which can clip to a helmet.

In many sporting competitions, the participants either elect or are required to wear mouthguards to protect the teeth, jaw, and tongue of the participant. Mouthguards are provided in various shapes, sizes and configurations and are formed of a wide variety of materials to provide a number of alternatives to the participant depending on the sport being played, the degree of protection desired, and the degree of comfort to the user. For example, some mouthguards are formed of a synthetic rubber material and are designed for the user to bite onto the guard to provide protection to the upper and lower teeth. These guards are not necessarily fitted to the user and thus do not often provide the best fit. Other guards are formed of synthetic plastic material which become pliable when heated, allowing the user to bite into the softened material to mold the guard to the user's teeth for a custom fit. Mouthguards can also be fitted via specialists who first create a mold of a user's teeth and then use that mold to create the mouthguard. Such mouthguards can be costly and not easily replaced.

While mouthguards are very effective at affording protection to the user's mouth, they often make it difficult for the participant to communicate with other participants. Accordingly, it is common for participants to remove their mouthguards when play is stopped. Further, once no longer participating in a sporting event, mouthguards are stored for future use.

Mouthguards can include a strap or similar device for connecting the mouthguard with a helmet. While such devices ensure a mouthguard is retained to a helmet, they can also be cumbersome and interfere with a participant during play. Further, when a mouthguard hangs from a helmet via a strap, and the helmet is placed on the ground or other surface, the mouthguard will contact that surface becoming dirty and/or contaminated.

For mouthguards without straps, many users will attempt to secure the mouthguard with a helmet by forcefully wedging it into openings or gaps in the helmet. This method is typically not effective, and often leads to mouthguards inadvertently being dropped onto the playing surface where they may be contaminated or lost, particularly when the mouthguard is dropped on an outdoor playing field. For users that have a mouthguard that has been specifically molded to his or her teeth, losing a mouthguard can be frustrating and potentially costly. For sports that require use of a mouthguard for a player to participate, losing a mouthguard could keep a person from participating in an event.

SUMMARY OF THE DISCLOSURE

Accordingly, it is an object of the present disclosure to provide a device for connecting a mouthguard with a helmet. The device includes a clip assembly with a base adapted for connection with the helmet and an arm releasably connected at a first end with the base. The arm is formed of resilient material and operable between an open position for receiving the mouthguard and a closed position for retaining the mouthguard against the helmet. Preferably, the resilient material is a synthetic plastic.

In one embodiment, the arm has an elongated concave configuration. A second end of the arm includes a first portion which abuts against the helmet and a second portion for engagement by a finger of a user to displace the arm between the open and closed position.

In a second embodiment, the clip assembly includes a pressure release buckle for removably connecting the arm with the base. For such an embodiment, the base includes a chamber open at one end for receiving the arm first end and the arm first end includes at least one spring component for engaging with and disengaging from the opening.

In another embodiment, the base chamber contains two symmetrically disposed side openings and the arm first end includes two symmetrically disposed prongs extending therefrom. The prongs are configured to engage and disengage with the symmetrically disposed side openings. Preferably, the base comprises a top wall, bottom wall, and at least two side walls which contain the side openings.

In yet another embodiment, there is a connection device for connecting the base with a helmet. The connection device is preferably a compression fitting that has an upper wall connected with a lower wall which defines a space therebetween. The inner surface of the walls are configured to receive a facemask bar or a helmet side wall. Preferably, the connection device upper and lower walls each contain an aligned opening for receiving a threaded fastener. In this embodiment, the base contains a pair of aligned openings for receiving the threaded fastener, connecting the base with the connection device.

BRIEF DESCRIPTION OF THE FIGURES

Other objects and advantages of the disclosure will become apparent from a study of the following specification when viewed in the light of the accompanying drawing, in which:

FIG. 2 is a top cross-sectional view of one embodiment of the clip assembly according to the present disclosure;

FIG. 3 is a top view of one embodiment of the device according to the present disclosure with the arm released from the base;

FIG. 4 is a perspective view of the embodiment of FIG. 3 with the arm connected with the base;

DETAILED DESCRIPTION

Figure 1:
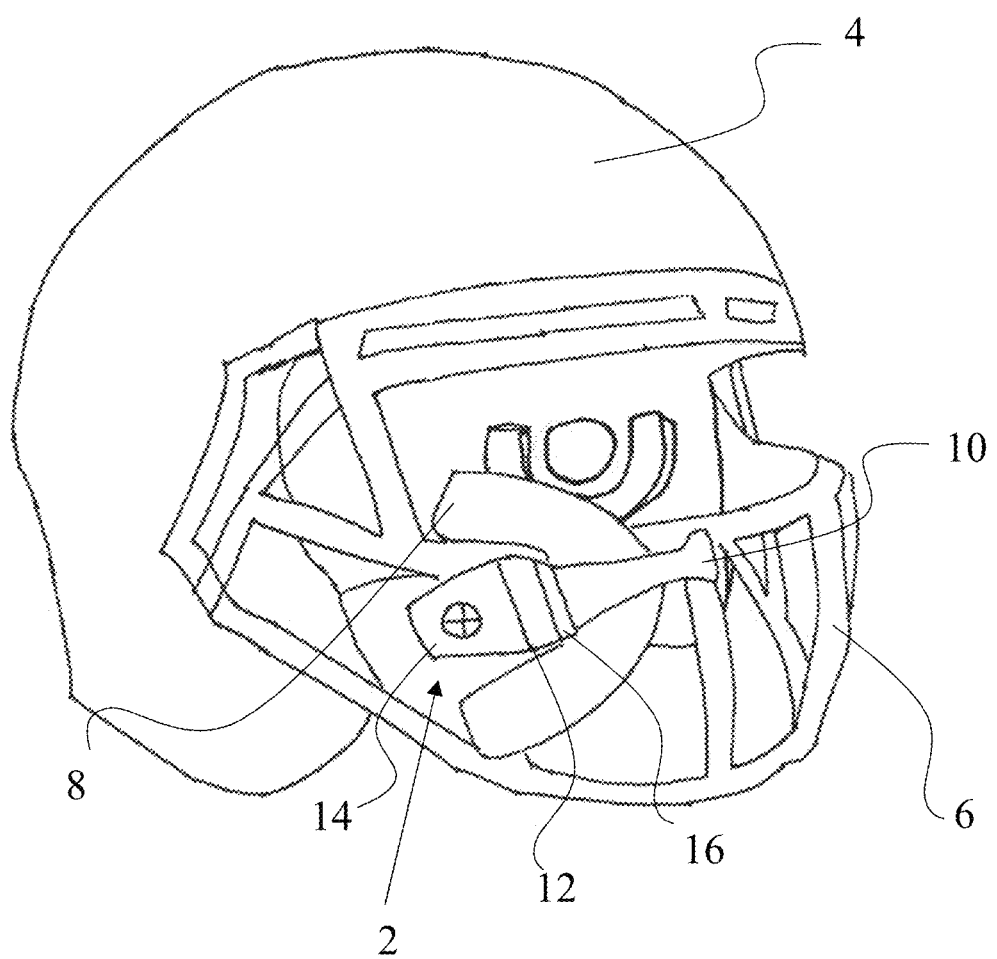
FIG. 1 is a perspective view one embodiment of the device connected with a helmet for retaining a mouthguard.

The present disclosure is directed toward a mouthguard retaining device for connecting a mouthguard with a helmet. FIG. 1 shows a first example of such a device 2 connected with a football helmet 4. There, the device is connected to a bar of the helmet facemask 6 and the mouthguard 8 is connected with the helmet via an elongated arm 10 that compresses the mouthguard against the facemask. In other embodiments, the mouthguard retaining device is connected with a hockey, lacrosse, baseball, or other helmet. The device can connect with a facemask bar, as shown in FIG. 1, but it can also be connected with a side wall, visor, or other element of a helmet. Most important, as discussed below, the mouthguard retaining device includes a clip assembly 12 which allows for the arm 10 of the device to engage and disengage with the base 14 of the device at a first end of the arm 16. The device and clip assembly can be attached to any number of locations on a helmet without deviating from the principle use of the device, which is a mouthguard retaining device that can easily attach with and detach from a helmet.

FIGS. 2-4 show a preferred embodiment of the presently disclosed device. The device 2 includes a clip assembly 12 with a base 14 and an arm 10 releasably connected at a first end 16 with the base. The base contains two symmetrically disposed side openings 18 and the arm includes two symmetrically disposed prongs 20 extending from the first end of the arm. As best shown in the cross-sectional view of FIG. 2, each prong is configured to engage and disengage with one of the symmetrically disposed side openings. Essentially, the first end of the arm is inserted into the base and the two prongs clip into place with the two side openings. The prongs are made of a resilient material providing a spring force. When the prongs are inserted into the base, they are compressed, and when they engage with the openings, they are released to their normal state. To remove the arm from the base, the prongs are squeezed together, again compressing them, and the arm is pulled from the base. It will be understood by those with skill in the art that the clip assembly described above is one example of how the base and arm could be connected. Other clip assemblies that allow for releasable connection between the base and arm are contemplated.

Figure 5:
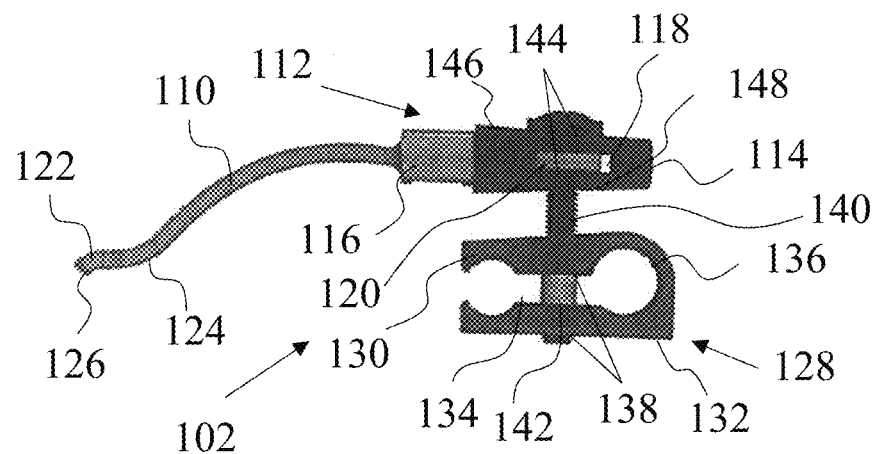
FIGS. 5-7 are side, top and perspective views, respectively, of a second embodiment of the device according to the present disclosure.
Figure 6:
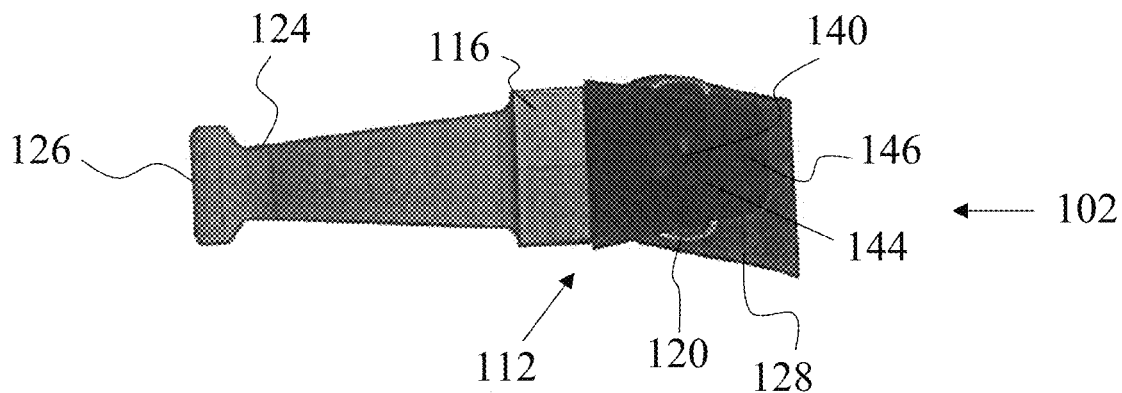
Figure 7:
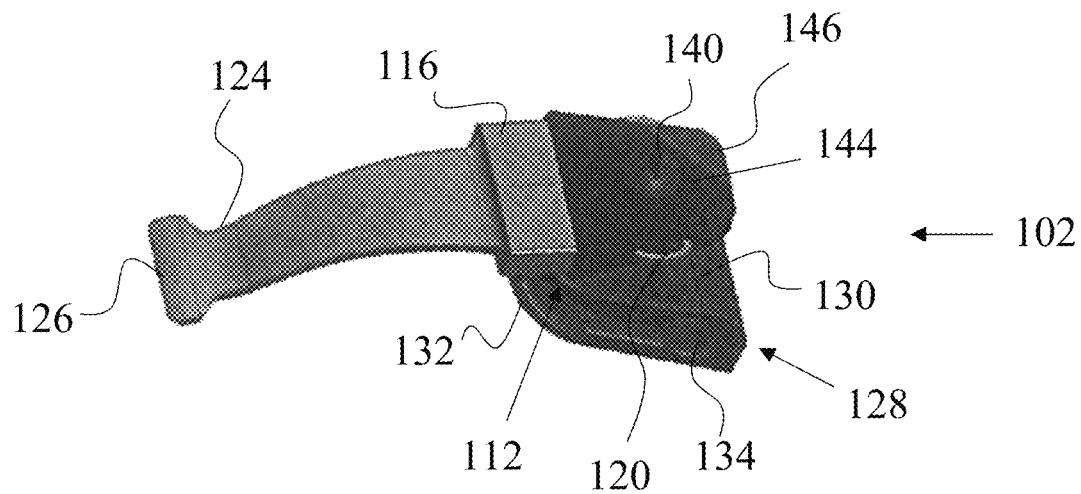

Referring now to FIGS. 5-7, a separate embodiment of the present device is shown. As with the base and arm of the device in FIGS. 2-4, the device 102 includes a clip assembly 112 with a base 114 adapted for connection with a helmet (not shown) and an arm 110 releasably connected at a first end 116 with the base via prongs 120 and base openings 118. The arm is formed of resilient material, preferably a synthetic material, and is operable between an open position for receiving the mouthguard and a closed position wherein the mouthguard is retained by the arm against the helmet. The arm has an elongated concave configuration. A second end 122 of the arm includes a first portion 124 which abuts against a helmet, and a second portion 126 for engagement by a finger of a user to displace the arm between the open and closed position.

For the embodiment of FIGS. 5-7, there is also a connection device 128 for connecting the base with a helmet (not shown). The connection device is a compression fitting that has an upper wall 130 connected with a lower wall 132. There is a space 134 between the two walls for connection with a helmet. As shown in FIG. 5, the inner surface 136 of the walls which define the space are configured to receive two facemask bars. The upper and lower walls each contain an aligned opening 138 for receiving a threaded bolt 140. Between the two openings is a threaded nut 142 through which the bolt is screwed. Further, the base contains a pair of aligned openings 144 through a top wall 146 and a bottom wall 148 for connecting the base with the connection device via the bolt.

The connection device 128 is arranged around two bars of a facemask (not shown) so that the bars rest within the portions of the inner surface 136 of the walls that are configured to receive the bars. The bolt is then tightened compressing the top and bottom wall against the facemask bars and securing the connection device with the helmet. It will be understood by those with skill in the art that the connection device could have alternate configurations. For instance, the helmet inner surface of the walls could be configured to receive a single facemask bar, or the walls could be configured to attach to the side wall of a helmet.

Figure 8:
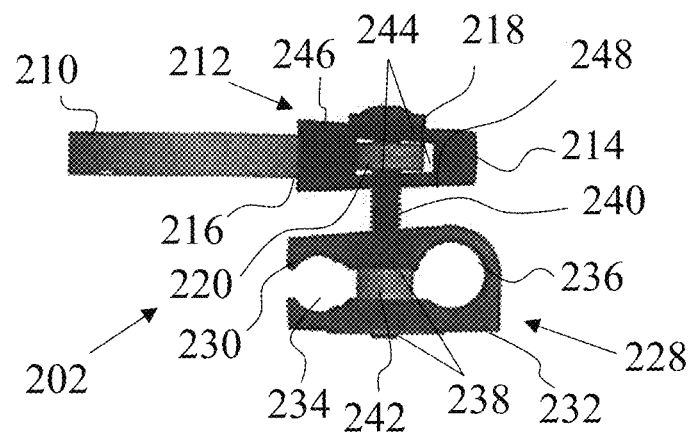
FIGS. 8 and 9 are side and perspective views, respectively, of a third embodiment of the device according to the present disclosure.
Figure 9:
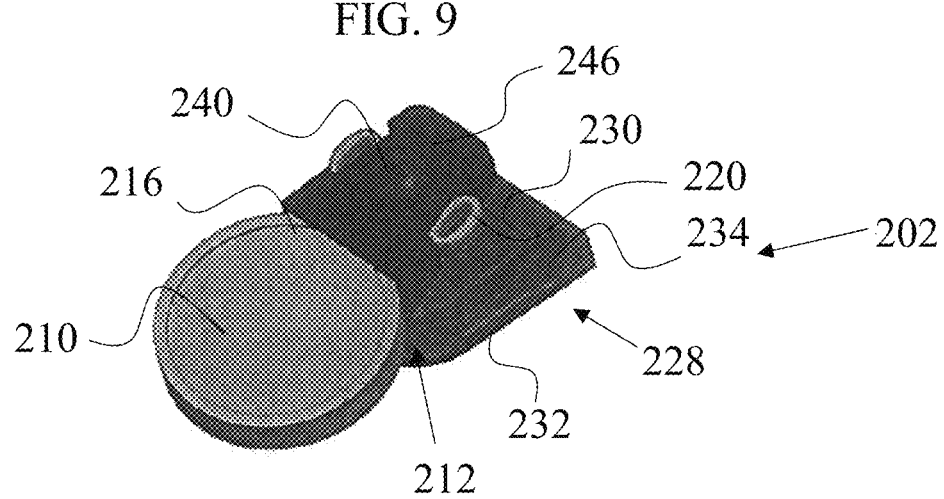

FIGS. 8 and 9 show yet another embodiment of the mouthguard retaining device. The device 202 includes a clip assembly 212 with a base 214 adapted for connection with a helmet and an arm 210 releasably connected at a first end 216 with the base via prongs 220 and base openings 218. Unlike in the other embodiments, the arm has a circular configuration. As with the embodiment in FIGS. 5-7, there is a connection device 228 for connecting the base with a helmet (not shown). The connection device is a compression fitting that has an upper wall 230 connected with a lower wall 232, each containing openings 238 through which a threaded bolt 240 is screwed. A threaded nut 242 is arranged between the openings for receiving the bolt. There is a space 234 between the two walls and an inner surface 236 of the walls that is configured to receive two facemask bars. The base contains a pair of aligned openings 244 through a top wall 246 and a bottom wall 248 for connecting the base with the connection device via the bolt. When connected to a helmet, a mouthguard is wedged between the arm and a helmet to retain the mouthguard.

Figure 10:
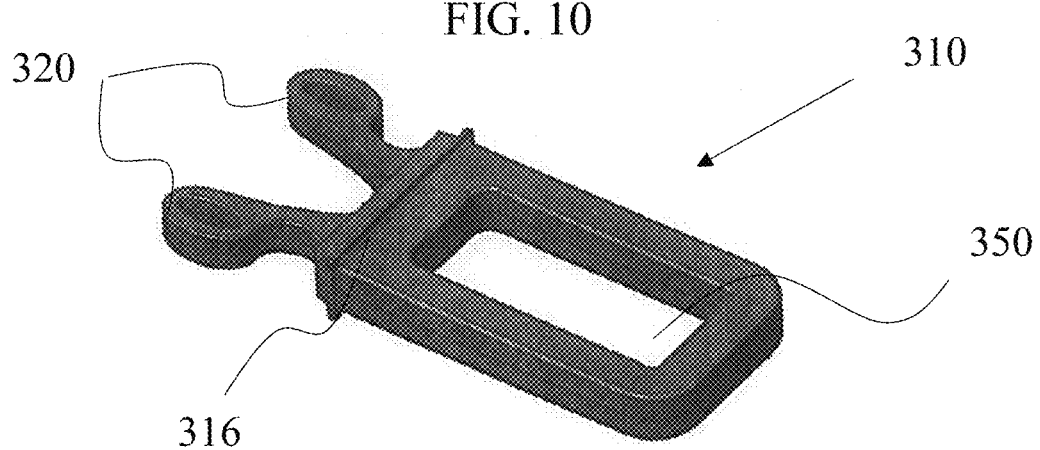
FIG. 10 is a perspective view of a separate arm for one embodiment of the device according to the present disclosure.

FIG. 10 is an alternate embodiment of an arm 310 for a mouthguard retaining device according to the present disclosure. The arm is substantially rectangular and contains a central opening 350. As with other embodiments, a first end 316 of the arm has two symmetrically disposed prongs 320 for connection with base openings (not shown). The central opening secures a mouthguard by inserting one end of the mouthguard through the opening and/or by securing a mouthguard strap, or other device from which a mouthguard can hang, to the opening.

Although the above description with reference to particular embodiments it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A device for connecting a mouthguard with a helmet, comprising:
   (a) a connection device comprising a compression fitting having an upper wall and a lower wall defining a space therebetween, an inner surface of said walls configured to receive at least two facemask bars, said connection device containing a pair of aligned openings configured for receiving a fastener; and
   (b) a clip assembly connected with said connection device, including:
      i. a base containing a pair of aligned openings through a top wall and a bottom wall for connecting said base with said connection device via a fastener when said base aligned openings are aligned with said connection device aligned openings; and
      ii. an arm releasably connected at a first end with said base, said arm being formed of resilient material and operable between an open position for receiving the mouthguard and a closed position wherein the mouthguard is retained by said arm against the facemask.

2. A device as defined in claim 1, wherein said arm comprises an elongated configuration.

3. A device as defined in claim 2, wherein said arm further comprises a concave configuration.

4. A device as defined in claim 3, wherein a second end of said arm includes a first portion and a second portion having a width greater than a width of the first portion for engagement by a finger of a user to displace said arm between the open and closed position.

5. A device as defined in claim 1, and further comprising a pressure release buckle for removably connecting said arm first end with said base.

6. A device as defined in claim 5, wherein said base contains a chamber open at one end for receiving said arm first end, said arm first end including at least one spring component for engaging with and disengaging from said open end of said chamber.

7. A device as defined in claim 5, wherein said base contains a chamber open at one end for receiving said arm first end, said chamber containing two symmetrically opposed side openings and said arm first end including two symmetrically opposed prongs extending therefrom, each prong configured for engaging and disengaging with said symmetrically opposed side openings.

8. A device as defined in claim 7, wherein said base further comprises at least two side walls, said at least two side walls containing said side openings.

9. A device as defined in claim 1, wherein said resilient material comprises a synthetic plastic.

10. A device for connecting a mouthguard with a helmet, comprising:
(a) a connection device including a compression fitting having an upper wall and a lower wall containing aligned openings configured for a fastener, an inner surface of said upper and lower walls configured to receive two facemask bars for connecting the device with a helmet facemask;
(b) a clip assembly connected with said connection device including:
  i. a base having top, bottom and side walls defining an inner chamber, said top and bottom walls containing aligned openings configured to receive a fastener; and
  ii. an arm having a first end releasably connected with said base, a midsection, and a second end finger grip having a width greater than a width of said midsection, said arm being formed of resilient material and operable between an open position for receiving the mouthguard and a closed position wherein the mouthguard is retained by said arm against the facemask; and
(c) a fastener extendable through said base aligned openings and said connection device aligned openings, whereby when said connection device walls are arranged about two facemask bars, said base openings are aligned with said connection device openings, and said fastener is extended through said base and connection device openings to secure the device to a helmet, a mouthguard is connected with the helmet via said clip assembly arm.

11. A device for connecting a mouthguard with a helmet as defined in claim 10, wherein said clip assembly is pivotably connected with said connection device.

* * * * *